United States Patent [19]

Sturman, Jr. et al.

[11] Patent Number: 5,483,043

[45] Date of Patent: Jan. 9, 1996

[54] INDUCTION HEATING OF POLYMER MATRIX COMPOSITES IN A MOLD PRESS

[75] Inventors: Philip C. Sturman, Jr., Rexford, N.Y.; Robert A. Gray, Cincinnati, Ohio

[73] Assignee: General Electric Company, Schenectady, N.Y.

[21] Appl. No.: 160,712

[22] Filed: Nov. 29, 1993

[51] Int. Cl.⁶ .................................................. H05B 6/10
[52] U.S. Cl. ........................... 219/647; 219/634; 219/659; 219/672; 425/174.8 R; 264/486
[58] Field of Search ........................... 219/647, 651, 219/659, 675, 656, 674, 602, 672, 633, 634; 425/174.8 R, 174; 264/25, 26, 27

[56] References Cited

U.S. PATENT DOCUMENTS

| | | | |
|---|---|---|---|
| 1,725,465 | 8/1929 | Manson | 219/634 |
| 2,393,130 | 1/1946 | Toulmin, Jr. | 219/602 |
| 2,657,298 | 10/1953 | Andrus | 219/647 |
| 3,100,436 | 8/1963 | McNeill et al. | 219/659 |
| 3,467,806 | 9/1969 | Dixon | 219/659 |
| 3,735,082 | 5/1973 | Kasper | 219/674 |
| 3,740,512 | 6/1973 | Mitchell et al. | 219/659 |
| 4,439,492 | 3/1984 | Wada et al. | 264/25 |
| 4,563,145 | 1/1986 | de Meij | 425/174.8 R |
| 4,649,249 | 3/1987 | Odor | 219/675 |
| 4,749,833 | 6/1988 | Novorsky et al. | 219/634 |
| 5,139,407 | 8/1992 | Kim et al. | 425/174.8 E |
| 5,338,497 | 8/1994 | Murray et al. | 264/25 |

OTHER PUBLICATIONS

Miller et al., "The Nature of Induction Heating in Graphite–Fiber, Polymer–Matrix Composite Materials," SAMPE Journal, vol. 26, No. 4, Jul./Aug. 1990, pp. 37–54.
Williams et al., "Induction Welding of Thermoplastic Composites," IMechE, C400/034, 1990, pp. 133–136.
Border, "The Heat's On For Quick Composite Repair," Machine Design, Mar. 7, 1991, pp. 71–74.

*Primary Examiner*—Philip H. Leung
*Attorney, Agent, or Firm*—Paul R. Webb, II

[57] ABSTRACT

Induction heating is utilized to heat polymer matrix composites containing electrically conductive fibers. This is accomplished with an apparatus having a mold with first and second cores positioned to receive a workpiece therebetween and first and second induction coils mounted to the first and second cores, respectively. Each induction coil is encapsulated in a layer of non-electrically conductive material which is attached to a surface of the respective core. A thermal insulation layer is attached to each layer of material, and a skin layer is attached to each thermal insulation layer. Alternatively, the induction coils can be embedded in the corresponding mold core. In another alternative, a single helical induction coil can be disposed around the two mold cores.

7 Claims, 4 Drawing Sheets

INDUCTION HEATING OF POLYMER MATRIX COMPOSITES IN A MOLD PRESS

CROSS REFERENCES TO RELATED APPLICATIONS

This application is related to applications entitled "induction Heating of Polymer Matrix Composites in an Autoclave," Ser. No. 08/160,713, U.S. Pat. No. 5,412,185 and "Induction Heating of Polymer Matrix Composite Fiber Strands," Ser. No 08/160,706, U.S. Pat. No. 5,357,085, both filed concurrently herewith and assigned to the same assignee as the present invention.

BACKGROUND OF THE INVENTION

This invention relates generally to an apparatus and method for heating polymer matrix composites and more particularly to induction heating of polymer matrix composites containing electrically conductive fibers for the purpose of curing, forming or joining the composite material.

A composite material combines two or more other materials into a single, integrated structure in a manner that the combined materials maintain their original identities. Polymer matrix composites comprise high-strength fibers embedded in a polymeric matrix. The matrix holds the fibers in the proper orientation and protects them from external damage. Polymeric matrix materials fall into two general classes, thermosetting and thermoplastic. The fibers can be configured in many different formats, depending on the intended application of the composite material. Known formats include chopped (molding compound), unidirectional sheet or tape, continuous strands (straight or braided), or woven cloth. Examples of materials typically used for the reinforcing fibers include carbon, graphite, boron and silicon carbide.

Conventional techniques for heating a polymer matrix composite part involve exposing the outer surfaces of the part to an external source of heat. Heat transport to the interior of the part occurs by conduction. This process requires that surface temperatures exceed interior temperatures for some or all of the production cycle. The rate of heating is dependent on this temperature gradient (i.e., the greater the temperature gradient, the faster the part will be fully heated). Since the polymeric matrix will be damaged if exposed to excessive temperature, the heating rate must be restrained (thus lengthening cycle time) so that no portion of the part exceeds the temperature limit.

In addition, some polymers undergo condensation-type chemical reactions during curing which produce volatile reactants. The higher exterior temperatures of conventional heating techniques tend to advance curing at the surface of the part, sometimes forming a hard, impermeable "skin" on the part surface which can trap the volatiles given off during the condensation-type reactions. Trapped volatiles usually result in excessive voids and delaminations, essentially rendering the finished part useless.

Induction heating is one approach which can avoid the above-mentioned disadvantages. Induction heating occurs by exposing a workpiece to an oscillating magnetic field. The magnetic field is typically produced by passing an alternating current through a conducting coil situated near the workpiece. The applied field induces eddy currents in the workpiece, and the eddy currents generate heat by resistive effects. The induced eddy currents generally flow perpendicular to the applied magnetic field and tend to roughly mimic the coil current. Thus, to be susceptible to induction heating, the workpiece must be electrically conductive and be able to define electric paths which approximate the shape of the coil. Isotropic workpieces such as metallic plates easily meet these requirements even with spiral coils, but other workpieces are less susceptible to conventional induction heating.

Polymer matrix composites containing electrically conductive fibers could conduct electric currents, but the currents are essentially restricted to the electrically conductive fibers because of the high resistivity of the polymeric matrix material. Thus, composites lacking fibers which are oriented orthogonally to the applied magnetic field could not be heated by induction. For instance, a single sheet of unidirectional fiber reinforced composite would not be heated by a spiral coil because the unidirectional fibers could not conduct eddy currents in all of the orthogonal directions of the spiral coil.

Accordingly, there is a need for an apparatus and method for heating polymer matrix composites by induction heating, thereby rapidly heating the composites without the large temperature gradients necessary with conventional conductive heating.

SUMMARY OF THE INVENTION

The above-mentioned needs are met by the present invention which uses induction heating to heat polymer matrix composites containing electrically conductive fibers. Specifically, the present invention provides an apparatus comprising a mold having first and second cores positioned to receive a workpiece therebetween and means for inducing eddy currents in the electrically conductive fibers of the workpiece.

In a first embodiment, the means for inducing eddy currents comprises first and second induction coils mounted to the first and second cores, respectively and connected to a power supply. Each induction coil is encapsulated in a layer of non-electrically conductive material which is attached to a surface of the respective core. A thermal insulation layer is attached to each layer of material, and a skin layer is attached to each thermal insulation layer.

In a second embodiment, the means for inducing eddy currents comprises first and second induction coils embedded in the first and second cores, respectively. The induction coils comprise hollow tubing which is capable of carrying coolant therethrough. A thermal insulation layer is attached to a surface of each core, and a skin layer is attached to each thermal insulation layer.

In a third embodiment, the means for inducing eddy currents comprises a helical induction coil disposed around the first and second mold cores. The coil is positioned so that its longitudinal axis lies along the length of a workpiece situated between the mold cores.

By using induction heating, the present invention is able reduce heating time without the large temperature gradients of conventional processes. Consequently, composite laminates can be quickly cured without excessive voids and post-cure delaminations. The use of induction heating also produces short cycle times because only the workpiece (and not any supporting structure) is directly heated. Moreover, the present invention provides for rapid heating of composite parts without the need for artificial susceptors (e.g., metallic particles or screens). This is advantageous because besides the obvious weight penalty, such susceptors may compromise the mechanical properties and inspectability of the parts.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
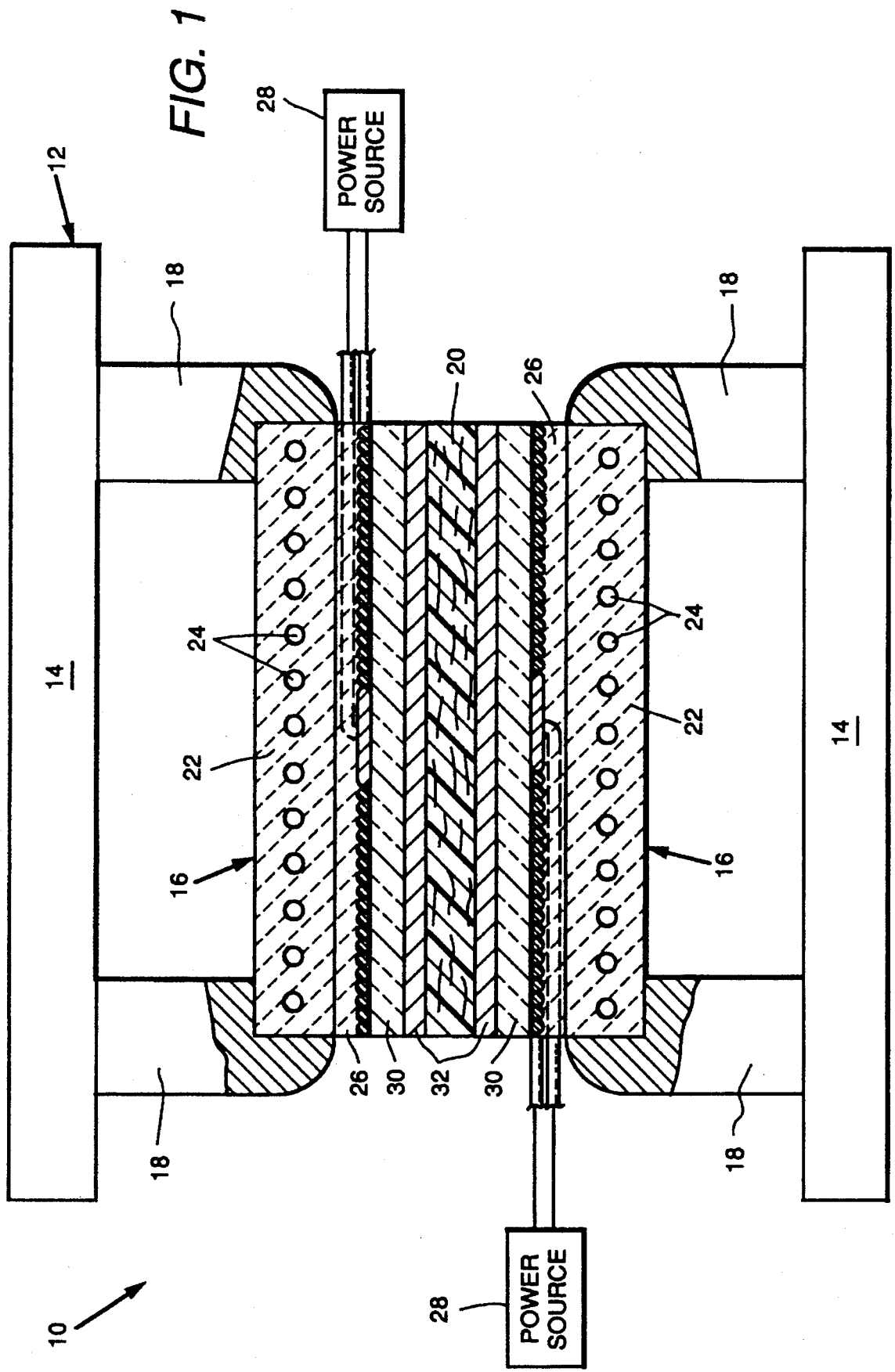
FIG. 1 is a partially cutaway side view of a first embodiment of the induction heating apparatus of the present invention.

Referring to the drawings wherein identical reference numerals denote the same elements throughout the various views, FIG. 1 shows an apparatus 10 for heating a polymer matrix composite containing electrically conductive fibers. The apparatus 10 includes a mold press 12 comprising two press platens 14 which produce compressive forces. Each press platen 14 has a mold half 16 attached thereto by a pair of mold supports 18. A polymer matrix composite workpiece 20 is positioned between the mold halves 16 for treatment. The composite workpiece 20 comprises a polymeric matrix embedded with fibers made of an electrically conducting material. Suitable fiber materials include carbon (particularly amorphous carbon and graphite) and some metals.

The mold halves 16 each have a base or core 22 preferably made of a non-electrically conductive, nonmagnetic material with high mechanical strength. Suitable materials include ceramics and plastics. These materials have a very low susceptibility to induction heating and are capable of withstanding molding forces. Coolant-carrying passageways 24 are provided in each core 22 to cool the mold halves 16. An induction heating element 26 is attached to the inner surface of each of the mold cores 22. Each heating element 26 is connected to an AC power source 28 which is capable of producing an alternating current in a frequency range suitable for induction heating. Although two separate power sources 28 are shown in the Figure, the two heating elements 26 both could be connected to a single power source.

A thermal insulation layer 30 of non-electrically conductive material is attached to the inner surface of each induction heating element 26. The thermal insulation layers 30, which can comprise, plastics, plastic composites or ceramics for example, prevent heat generated in the workpiece 20 from transferring to the mold cores 22. A skin layer 32 of non-electrically conductive material is attached to the inner surface of each thermal insulation layer 30. The skin layers 32 contact the workpiece 20 and are designed to provide hard, durable molding surfaces having the desired shape and surface characteristics. The separate skin layers 32 may be omitted if the thermal insulation layers 30 are made of a material which can provide adequate hardness and surface characteristics.

Figures 2, 3:
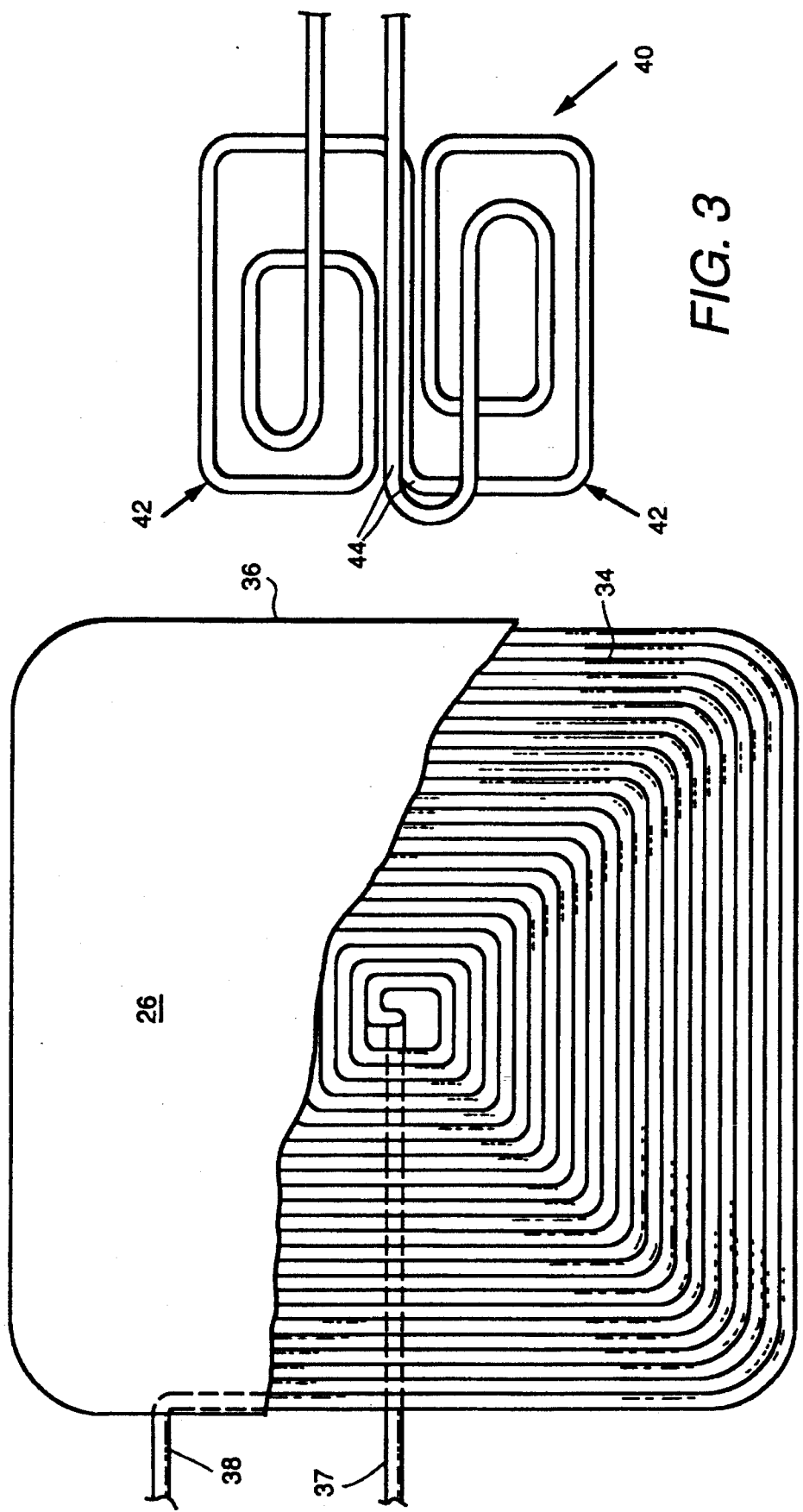
FIG. 2 is a partially cutaway top view of an encapsulated spiral induction coil.
FIG. 3 is a top view of a "double-dee" induction coil.

FIG. 2 shows one preferred embodiment of one of the induction heating elements 26. The induction heating element 26 of FIG. 2 comprises a flat spiral wound induction coil 34 encapsulated in a layer of non-electrically conductive material 36 such as plastic, mica or ceramic. The coil 34 is preferably wound with a stranded wire, such as copper wire, and has two leads 37,38 extending beyond the encapsulation 36 for connection with the corresponding AC power source 34. The first lead 37 extends from the center of the coil 34, and the second lead 38 extends from the periphery of the coil 34. Instead of stranded wire, the induction coil 34 alternatively may be made of hollow tubing so that a coolant such as water can be passed therethrough. The tubing must comprise an electrical conductor (e.g., copper) capable of carrying sufficiently large currents. When the coil 34 comprises coolant carrying tubing, the thermal insulation layer 36 can be located between the core 22 and the induction heating element 26 instead of between the induction heating element 26 and the skin layer 32.

The flat coil configuration shown in FIGS. 1 and 2 is only illustrative and not limitative. The induction coils 34 will generally have the same general surface area and shape as the piece to be heated. Thus, more complex coil shapes are utilized to match more complex workpiece shapes. Furthermore, the coils 34 need not necessarily be wound as tightly as shown in FIG. 2. The coil density is chosen to provide a desirable circuit impedance in the circuit comprising the coil 34, the AC power source 28 and the workpiece 20. Generally, the lower the coil density is, the higher the frequency of the power source 28 will be. In addition, although two induction coils 34 are preferred, one coil can be sufficient for some applications, such as when heating particularly thin workpieces.

The coils 34 are also not limited to the spiral geometry of FIG. 2. For instance, coils having the so-called double-dee geometry can be used. A double-dee induction coil 40 is shown in FIG. 3. The double-dee coil 40 is formed into two portions 42 which are shaped like two back-to-back "D's" having adjacent straight sides 44. The two portions 42 are wound such that the current in one portion flows clockwise at the instant that the current in the other portion is flowing counterclockwise. The currents in the two straight sides 44 thus flow in the same direction at any given instant. Hence, the double-dee coil 40 can be used to focus the magnetic field in a relatively narrow band.

The fibers of the workpiece 20 must be arranged in a format which provides good electrical conducting paths. Woven cloths in particular are able to define electric conducting paths in orthogonal directions as is necessary for either of the convoluted coil shapes of FIGS. 2 and 3. Unidirectional sheets or tapes arranged in multiple crossed plies are also able to define orthogonal conducting paths. Theoretically, a composite workpiece having chopped fibers could be used but the composite material would have to be carefully prepared to ensure that sufficient electrical contact between the fibers existed.

In operation, the workpiece 20 is placed between the mold halves 16, and the mold press 12 is activated. At the same time, the power sources 28 are activated so as to deliver an alternating current to the corresponding induction coils 34 which in turn generate an oscillating magnetic field. The power sources 28 operate at a frequency which is suitable for induction heating and complies with industry standards and regulations. The magnetic field induces eddy currents in susceptible workpiece fibers, thereby causing the workpiece 20 to be heated. It has been found that only a small amount of fibers need be oriented orthogonally to the magnetic field to provide the dissipation necessary to heat the workpiece 20. The oscillating magnetic field is maintained long enough to achieve the desired degree of heating.

Figure 4:
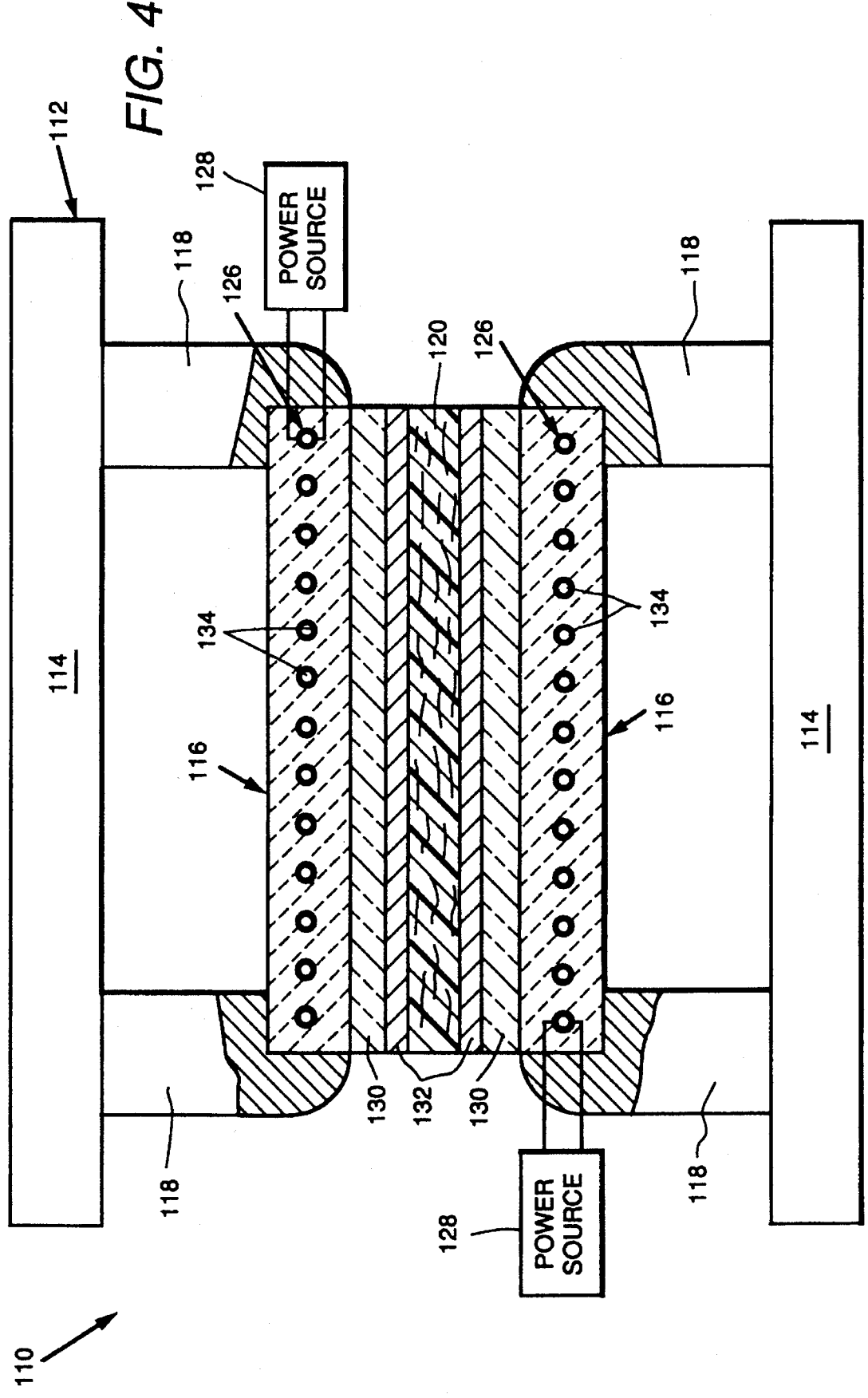
FIG. 4 is a partially cutaway side view of a second embodiment of the induction heating apparatus of the present invention.

FIG. 4 shows a second embodiment of the present invention which is an apparatus 110 for heating a polymer matrix composite containing electrically conductive fibers. The apparatus 110 includes a mold press 112 comprising two press platens 114 which produce compressive forces. Each press platen 114 has a mold half 116 attached thereto by a pair of mold supports 118. A polymer matrix composite workpiece 120 is positioned between the mold halves 116 for treatment.

Each mold half 116 comprises a base or core 122 having an induction heating element 126 embedded therein. Each heating element 126 is connected to an AC power source 128 which is capable of producing an alternating current in a frequency range suitable for induction heating. A thermal insulation layer 130 of non-electrically conductive material is secured to the inner surface of each the mold cores 122. The thermal insulation layers 130 prevent heat generated in the workpiece 120 from transferring to the mold cores 122. A skin layer 132 of non-electrically conductive material is secured to the inner surface of each thermal insulation layer 130. The skin layers 132 contact the workpiece 120 and are designed to provide hard, durable molding surfaces having the desired shape and surface characteristics. The separate skin layers 132 may be omitted if the thermal insulation layers 130 are be made of a material which can provide adequate hardness and surface characteristics.

Each of the induction heating elements 126 comprises an induction coil 134 made of hollow tubing so that a coolant such as water can be passed therethrough. The tubing must comprise an electrical conductor (e.g., copper) capable of carrying sufficiently large currents. The induction coils 134 will generally have the same general surface area and shape as the piece to be heated and, as described above in connection with the first embodiment, can be configured in a spiral, double-dee or other geometry. The apparatus 110 will operate in similar fashion to the apparatus 10 of the first embodiment.

Figure 5:
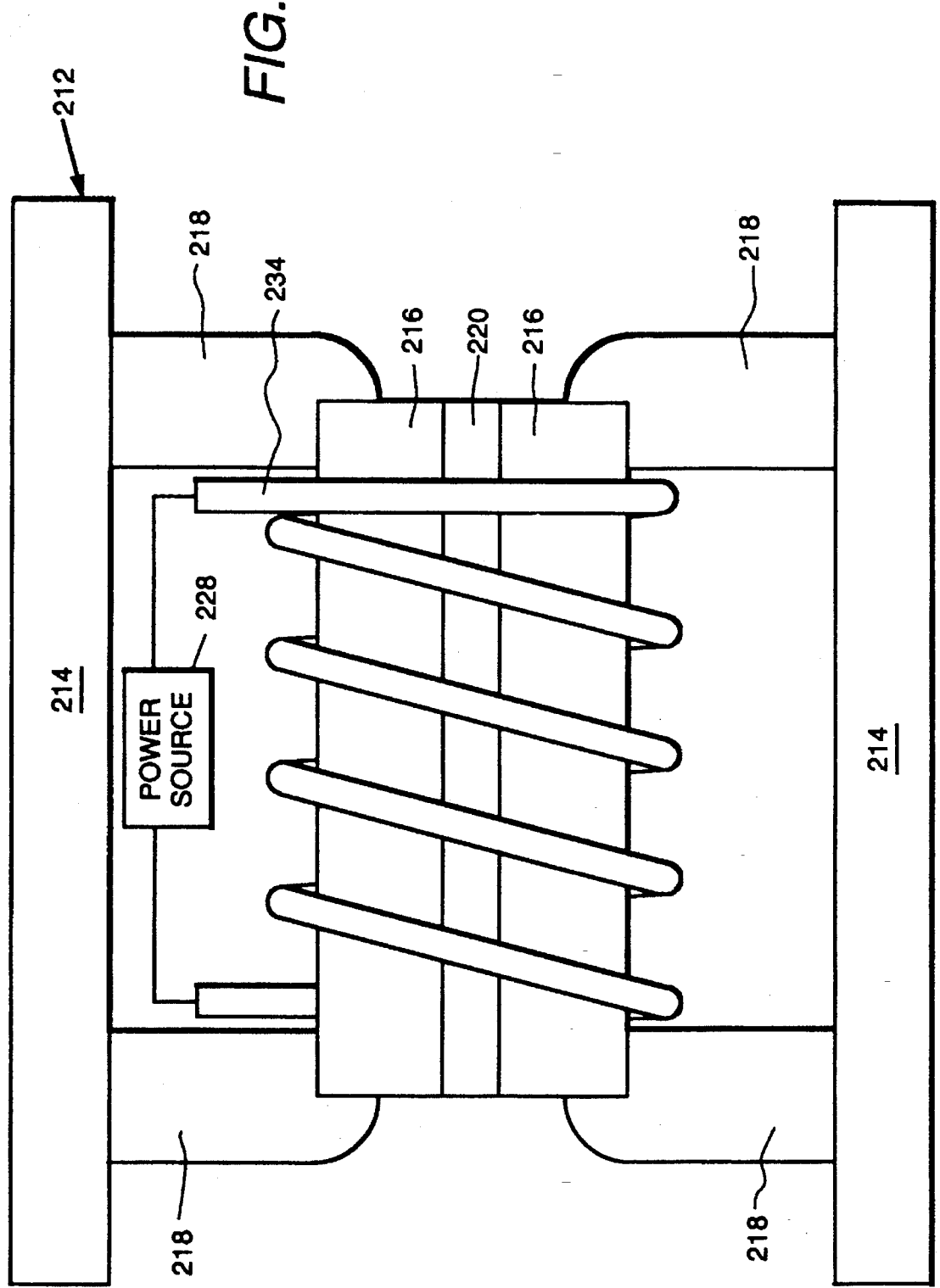
FIG. 5 is a side view of a third embodiment of the induction heating apparatus of the present invention.

FIG. 5 shows a third embodiment of the present invention which is an apparatus 210 for heating a polymer matrix composite containing electrically conductive fibers. The apparatus 210 includes a mold press 212 comprising two press platens 214 which produce compressive forces. Each press platen 214 has a mold half 216 attached thereto by a pair of mold supports 218. The mold halves 216 are preferably made of a non-electrically conductive, nonmagnetic material with high mechanical strength and are shaped to receive a polymer matrix composite workpiece 220 therebetween. Coolant-carrying passageways (not shown) are provided in each of the mold halves 216 for cooling purposes. The workpiece 220 is preferably of a cylindrical shape. For instance, the workpiece 220 could be polymer matrix composite disposed around the outer surface of a cylindrical mandrel.

An elongated helical induction coil 234 is disposed around the mold halves 216 so that the longitudinal axes of the induction coil 234 and an annular workpiece 220 disposed between the mold halves 216 substantially coincide. The coil 234 is positioned so that the workpiece 220 (or the portion thereof intended to be heated) is situated entirely within the magnetic field generated by the coil 234, and the turns of the coil 234 circle the workpiece 220 in a direction substantially perpendicular to its longitudinal axis. The coil 234 is an electrical conductor (e.g., copper) capable of carrying sufficiently large currents and may be in the form of stranded wire or hollow tubing. If made of hollow tubing, a coolant such as water can be passed through the coil 234. The induction coil 234 is connected to an AC power source 228 which is capable of producing an alternating current in a frequency range suitable for induction heating.

The composite workpiece 220 comprises a polymeric matrix embedded with fibers made of an electrically conducting material. Suitable fiber materials include carbon (particularly amorphous carbon and graphite) and some metals. The fibers are preferably in the form of woven cloths or unidirectional sheets or tapes because these fiber formats provide good electrical conducting paths. Theoretically, a composite workpiece having chopped fibers could be used but the composite material would have to be carefully prepared to ensure that sufficient electrical contact between the fibers existed.

In operation, the workpiece 220 is placed between the two mold halves 216 and the mold press 212 is activated. The workpiece 220 is arranged in the mold press 212 so that at least some of the fibers are oriented circumferentially, thereby forming electrical conducting paths which are perpendicular to the longitudinal axes of the workpiece 220 and the coil 234. At the same time, the power source 228 is activated so as to deliver an alternating current to the induction coil 234 which in turn generates an oscillating magnetic field. The magnetic field generates eddy currents in the fibers of the workpiece 220 that are oriented orthogonally to the magnetic field, i.e., those fibers which form an electric circuit about the circumference of the annular workpiece 220. It has been found that only a small amount of circumferentially oriented fibers is required to provide the dissipation necessary to heat the workpiece 220. The oscillating magnetic field is maintained long enough to achieve the desired degree of heating.

The foregoing has described a method and apparatus which use induction heating to heat polymer matrix composites containing electrically conductive fibers. While specific embodiments of the present invention have been described, it will be apparent to those skilled in the art that various modifications thereto can be made without departing from the spirit and scope of the invention as defined in the appended claims.

What is claimed is:

1. An apparatus for heating a polymer matrix composite workpiece having electrically conductive fibers, said apparatus comprising:

a mold having first and second cores positioned to receive said workpiece therebetween; and an induction heating element attached to a surface of said first core, said induction heating element comprising an induction coil encapsulated in a layer of non-electrically conductive material.

2. The apparatus of claim 1 further comprising a power supply connected to said induction coil.

3. The apparatus of claim 1 further comprising a thermal insulation layer attached to said layer of material.

4. The apparatus of claim 3 further comprising a skin layer attached to said thermal insulation layer.

5. The apparatus of claim 1 further comprising a second induction heating element attached to a surface of said second core, said second induction heating element comprising a second induction coil encapsulated in a second layer of non-electrically conductive material.

6. The apparatus of claim 5 further comprising a second power supply connected to said second induction coil.

7. A method of heating a polymer matrix composite workpiece having electrically conductive fibers, said method comprising the steps of:

placing said workpiece in a mold having first and second cores positioned to receive said workpiece therebetween; and inducing eddy currents in said electrically conductive fibers of said workpiece.

* * * * *